Figure 1:
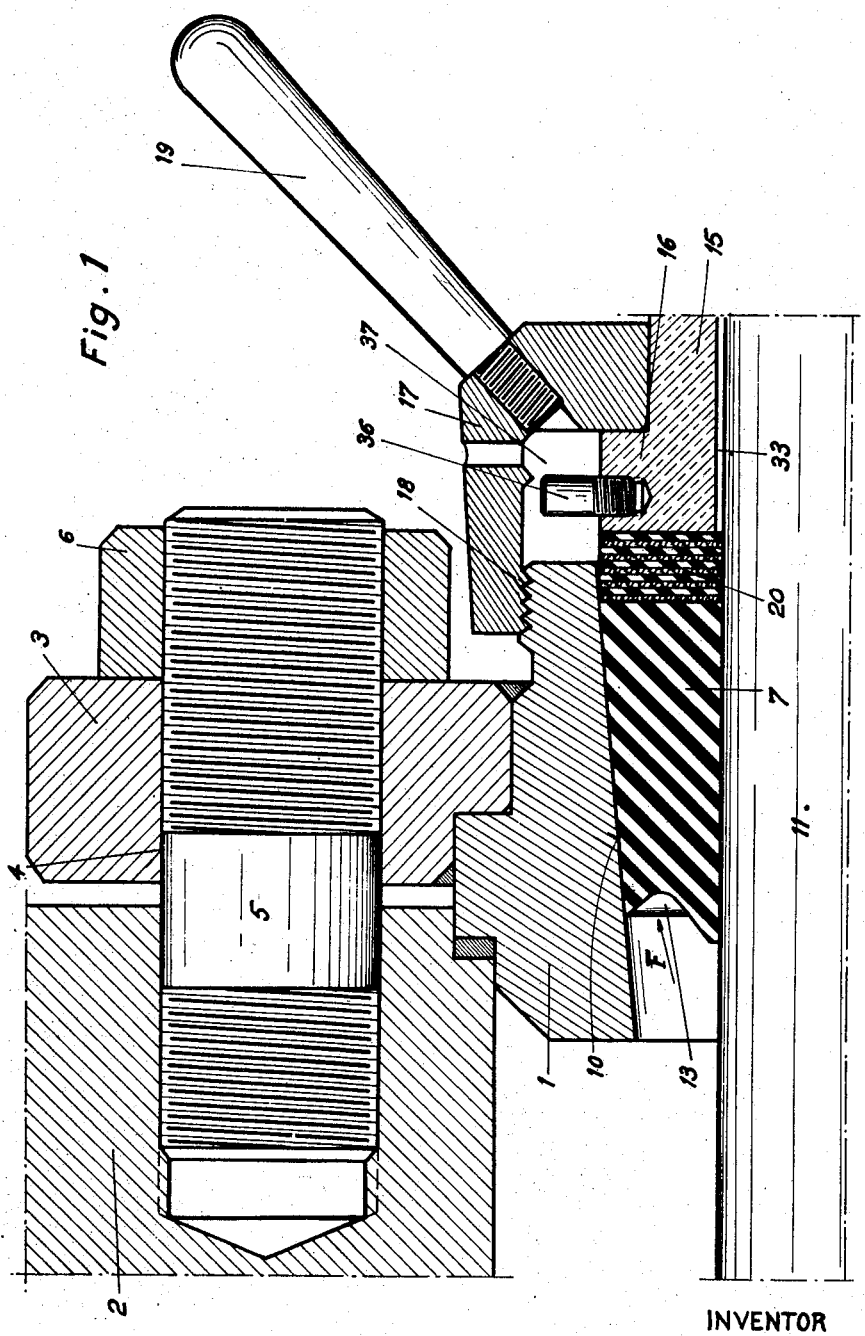

July 28, 1959  L. DICKY  2,896,980
PISTON ROD STUFFING BOXES
Filed March 22, 1956  2 Sheets-Sheet 2

INVENTOR
LEONIDE DICKY.
BY
ATTORNEYS.

United States Patent Office 2,896,980
Patented July 28, 1959

2,896,980

PISTON ROD STUFFING BOXES

Leonide Dicky, Paris, France, assignor to S. N. Marep, Paris, France, a corporation of France Application March 22, 1956, Serial No. 573,273

Claims priority, application France April 1, 1955

2 Claims. (Cl. 286—34)

The present invention relates to piston rod stuffing boxes and is concerned with that type wherein an externally conical packing is employed.

The principal object of the invention is to provide a construction and arrangement which is simpler and more efficacious than those heretofore known and which possesses technical advantages both as regards use and as regards the mounting and the replacement, when necessary, of the packing.

Externally conical packings have been proposed for stuffing boxes but have been inserted in conical sleeves which latter were placed in or connected with a stuffing box body formed with a cylindrical interior.

According to the present invention, a piston rod stuffing box comprises in combination, an externally conical elastic packing formed with a cylindrical extension at its smaller diameter end and with a cylindrical bore for the passage of the piston rod, a stuffing box chamber formed with a conical interior having a conicity corresponding with that of said packing, and presser means operative against the outer and larger diameter end of said packing for pressing the latter into and retaining it in said stuffing box chamber, the arrangement being such that the inner and smaller diameter end of said packing is always freely exposed to fluid pressure at the inner end of said stuffing box chamber and the cylindrical extension at this inner end being deformable so as to increase the tightness of the packing at this end when said packing becomes compressed by the action of said presser means.

Further according to the present invention a piston rod stuffing box comprises in combination, an externally conical elastic packing formed with an annular recess in its smaller diameter end and with a cylindrical bore for the passage of the piston rod, a stuffing box chamber formed with a conical interior having a conicity corresponding with that of said packing, and presser means operative against the outer and larger diameter end of said packing for pressing the latter into and retaining it in said stuffing box chamber, the arrangement being such that the recessed inner and smaller diameter end of said packing is always freely exposed to fluid pressure at the inner end of said stuffing box chamber and the formation of said recess being productive of concentric lips which, under the action of the fluid pressure, are respectively pressed tightly against the piston rod and the conical interior of said chamber.

Figure 2:
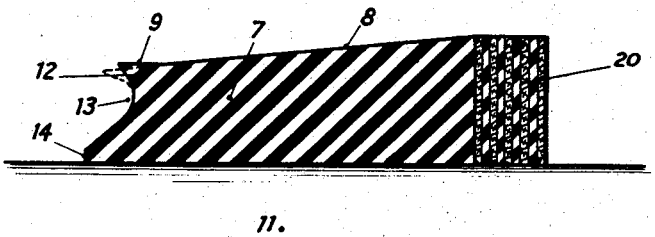
Figure 3:
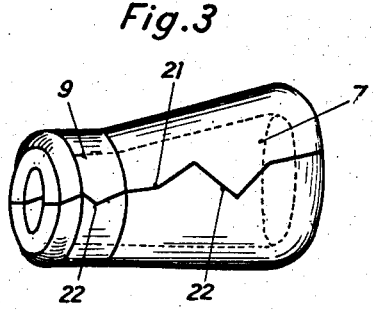

The invention is illustrated by one constructional example in the accompanying drawing, wherein:

Figure 1 is a half longitudinal section of a stuffing box arrangement particularly applicable to a pump, Figure 2 is a half longitudinal section of the packing seen in Figure 1 but as in its non-compressed condition before insertion into the stuffing box, and Figure 3 is a perspective view of a packing such as is seen in Figures 1 and 2 but longitudinally divided into two parts along a serrated or zig-zag path.

In Figure 1, 1 indicates a stuffing box body which is attached to a pump body 2 by means of a flanged ring 3 which engages an annular shoulder on the body 1. Bolts 5 appropriately screw threaded over each end portion are screwed with one end portion into the pump body 2. The ring 3 is formed with holes 4 corresponding to the bolts 5 to enable said ring to be mounted on said bolts and maintained in position thereon by nuts 6.

The stuffing box packing 7 is an externally conical elastic body, preferably of suitably treated rubber, with an axial cylindrical bore for the passage of the piston rod 11 of the pump. Before insertion and compression in the stuffing box, the packing 7 in accordance with the invention is of the form seen in Figure 2, or Figure 3, namely with a cylindrical extension 9 at the smaller diameter end of its conical part 8. The interior 10 of the stuffing box chamber is formed with a continuous conicity corresponding with the conicity of the packing 7. It will be seen, therefore, that when the packing 7 is inserted into the stuffing box chamber with its smaller diameter end in the lead and is gently forced inwards until put into compression between the piston rod 11 and the interior 10 of said chamber, the continuous conicity of the interior 10 acting upon the cylindrical extension 9 will deform the latter and cause a tightening of the packing effect at this end of the conical packing. It will be observed that the smaller diameter end of the packing 7 is not abutted against a surface or radial wall but is freely exposed to the pressure in the pump body as indicated by the arrow F in Figure 1. In the example illustrated, the inner end of the stuffing box chamber is fully open to the interior of the pump, but in any case the arrangement is such that the smaller diameter end of the packing 7 is never abutted against a radial wall but is at all times freely exposed as stated above. The deformation of the cylindrical extension 9 results in an annular projection or lip formation at the inner end of the packing 7, which lip is further pressed tightly outwards against the interior 10 of the stuffing box chamber by the fluid pressure indicated by the arrow F.

Advantageously, and in accordance with the invention, the smaller diameter end of the conical packing 7 is formed with an annular recess which is productive of an outer lip 12 and of an inner lip 14. This end of the packing being freely exposed to the pressure in the pump, as above explained, such pressure not only presses the outer lip 12 outwardly against the conical interior 10 of the stuffing box chamber but also presses the inner lip 14 against the piston rod 11 to give a tight packing. The deformation of the cylindrical extension 9 at the inner end of the packing 7, accentuates this lip formation in addition to effecting a tightening of the packing at this end in the manner already explained. Figure 2 shows in full lines the lip formation 12 before the insertion of the packing and in dotted lines the deformation producing accentuation of the lip formation when the packing has been inserted and put in a state of compression.

The packing 7 is squeezed into position by a shouldered gland or presser ring 15 which is forced with its inner and thicker part 16 against the packing by a cap nut 17 which is screwed on to the body 1 by a screw thread 18, the cap nut being engaged with the shoulder of the ring 15, as shown in Figure 1. This screwing is effected by means of oblique handles 19 solid with the nut 17, disposed relatively to the frame of the machine in such manner that it is not possible to force unduly the screwing of the packing by applying a long tube to the handles 19.

The fact that the packing 7 is not squeezed against an abutment surface substantially perpendicular to the axis of the piston, as is the usual practice, but has its inner extremity free, results in diminishing considerably the risk of crushing the packing. Moreover, the truncated conical form of the external surface of the packing 7 and of the internal surface 10 of the stuffing box body permits of the taking up of the wear of the packing as it is produced.

Preferably the packing 7 carries at its outer part a zone 20 strongly reinforced with fabric for best resisting the pressure against the part 15.

For permitting the putting in place and the removal with ease of the packing 7, the latter is formed of two halves separated in the longitudinal direction. This construction is seen in Figure 3, where one of the two surfaces of separation diametrically opposed is represented at 21. For changing the packing, it is sufficient to unscrew the nut 17, to withdraw the part 15 (by the aid of studs 36 if desired), to extract the packing 7; this being made easy by its conical form, then to separate the two halves of the packing 7 which are divided by the surfaces of separation illustrated in Figure 3. It is to be noted that these surfaces are not continuous but form teeth or zig-zags 22 constituting checks which prevent leakage along the surfaces of separation 21.

It should be understood that the invention is not limited to the modes of realization which have been described and illustrated, and that it is possible to modify the different parts so far as concerns their form or disposition without departing from the spirit of the invention. In particular, the arrangement which permits the squeezing of the packing 7 in the stuffing box could be different from the part 15 and the nut 17.

I claim:

1. In a stuffing box for a piston rod movably mounted in a member having a pressurized cavity within which the piston moves, in combination, a stuffing box body rigidly secured in said member cavity, a conical opening through the stuffing box body with the small end of the opening facing inwardly of the member cavity, a resilient packing ring having a conical body portion corresponding to the conicity of the stuffing box opening and having an axially extending cylindrical extension on the periphery of the small end of the packing ring, a cylindrical cavity extending through said packing ring receiving said piston rod, said packing ring being disposed within said stuffing box cavity with the larger end of the packing ring exposed for application of a force moving the ring inwardly of the said stuffing box cavity and the smaller end disposed wholly within the said cavity, a presser member movably mounted on said stuffing box for application of pressure against the large end of the packing ring, said presser member upon advancement of the packing ring along the stuffing box cavity causing compression of the ring into contact with said piston rod and the deformation of the cylindrical peripheral extension of the packing ring into conformity with the conical face of the stuffing box providing additional pressure of the small end of the packing ring upon the piston rod and the conical face of the stuffing box.

2. The structure as defined in claim 1 wherein the cylindrical peripheral extension of the packing ring has on its outer end an annular recess defined by an inner lip embracing the piston and an outer lip engaging the adjacent surface of the stuffing box, said outer lip being extended by compression of the said cylindrical extension of the packing ring and into engagement with the adjacent conical face of the stuffing box, said lips being further pressed respectively into engagement with the piston rod and stuffing box by pressure within the said member cavity receiving the piston rod.

References Cited in the file of this patent

UNITED STATES PATENTS

| 362,355 | Bradford | May 3, 1887 |
| 552,137 | Nelson et al. | Dec. 31, 1895 |
| 788,939 | Noxon | May 2, 1905 |
| 1,404,780 | Mason | Jan. 31, 1922 |
| 1,755,436 | Faudi | Apr. 22, 1930 |
| 1,867,045 | Young et al. | July 12, 1932 |
| 2,204,915 | Sharp | June 18, 1940 |
| 2,708,573 | Rovoldt | May 17, 1955 |

FOREIGN PATENTS

| 499,603 | Great Britain | Jan. 26, 1939 |